United States Patent [19]

Shu et al.

[11] Patent Number: 5,768,411

[45] Date of Patent: Jun. 16, 1998

[54] DISPERSED-DOT DITHER WITH IMPROVED LIGHT-COLOR SMOOTHNESS

[75] Inventors: Joseph Shu; Chia-Hsin Li, both of San Jose, Calif.

[73] Assignee: Seiko Epson Corporation, Tokyo, Japan

[21] Appl. No.: 607,075

[22] Filed: Feb. 26, 1996

[51] Int. Cl.$^6$ .................................................. G06K 9/00
[52] U.S. Cl. ........................... 382/162; 358/535; 358/457
[58] Field of Search ................................ 382/162, 167, 382/252, 270; 358/534, 535, 536, 456, 457, 465, 466; 395/109

[56] References Cited

U.S. PATENT DOCUMENTS

| | | |
|---|---|---|
| 4,595,948 | 6/1986 | Itoh et al. .................................. 358/535 |
| 4,809,063 | 2/1989 | Moriguchi et al. ........................ 358/535 |
| 5,422,742 | 6/1995 | Ostromoukhov et al. ............... 358/536 |

*Primary Examiner*—Leo Boudreau
*Assistant Examiner*—Phuoc Tran
*Attorney, Agent, or Firm*—Michael T. Gabrik

[57] ABSTRACT

To convert the multiple-bit-resolution intensity information for a color component of a given pixel into the ink-on or ink-off command required to control a printer, the source values for different pixels are compared with thresholds in a "dither matrix" of different thresholds for different pixels, and a given pixel is printed if the source value exceeds the dither-matrix value for that pixel. Different dither matrices are employed for different color components, with the result that lighter-color areas have a smoother appearance than they would result if a common dither matrix were employed for all color components.

16 Claims, 5 Drawing Sheets

| 1  | 17 | 5  | 21 |
| 25 | 9  | 29 | 13 |
| 7  | 23 | 3  | 19 |
| 31 | 15 | 27 | 11 |
FIG. 3A
| 31 | 15 | 27 | 11 |
| 7  | 23 | 3  | 19 |
| 25 | 9  | 29 | 13 |
| 1  | 17 | 5  | 21 |
FIG. 3B
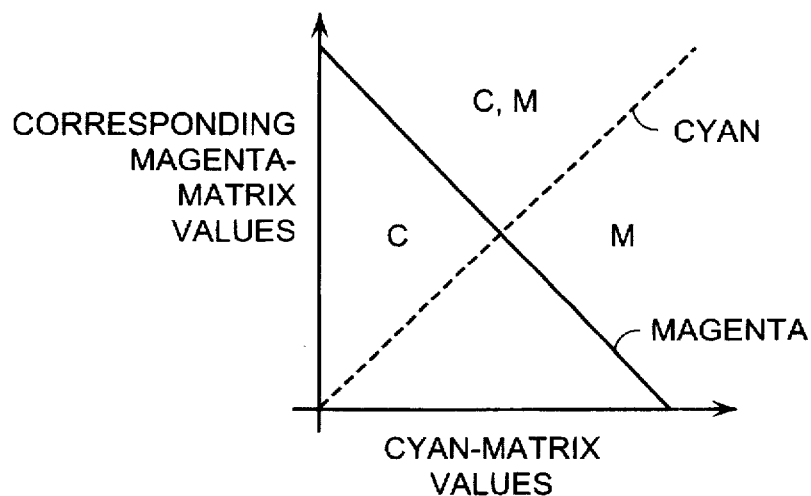
FIG. 4
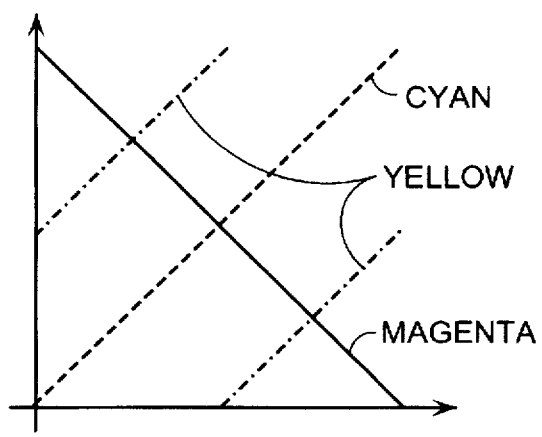
FIG. 5
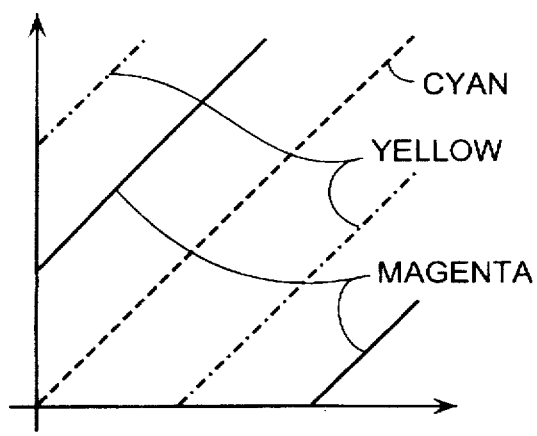
FIG. 6

DISPERSED-DOT DITHER WITH IMPROVED LIGHT-COLOR SMOOTHNESS

RELATED APPLICATIONS

Applicants hereby incorporate by reference the following U.S. patent applications contemporaneously filed and commonly assigned herewith:

U.S. patent application Ser. No. 08/607,074 of Joseph Shu and Chia-Hsin Li for GENERATING COLOR-CORRECTION LOOK-UP-TABLE ADDRESSES BY MULTI-LEVEL HALF-TONING, Assignee's docket no. AP016.

U.S. patent application Ser. No. 08/607,073 of Joseph Shu and Chia-Hsin Li for CLUSTERED-DOT DITHER WITH WHITE-FLECK SUPPRESSION, Assignee's docket no. AP018.

U.S. patent application Ser. No. 08/607,071of Joseph Shu and Chia-Hsin Li for BANDING NOISE REDUCTION FOR CLUSTERED-DOT DITHER, Assignee's docket no. AP019.

BACKGROUND OF THE INVENTION

The present invention relates to digital display devices such as printers and computer systems that use them. It particularly concerns improving such devices' tonal rendition.

At some point or another in the digital processing of an image, the image takes the form of picture-element, or "pixel" values, i.e. image values at discrete locations in the image. Being expressed digitally, those values are necessarily quantized, but they often are nonetheless expressed with a considerable degree of value resolution. The shade of gray in a "black and white" image, for instance, may be expressed with, say, eight bits or more of resolution, so that the pixel may take on any one of 256 or more values. A color-image pixel value is typically a three-dimensional vector quantity. If each vector component is expressed with eight bits of resolution, a spectrum of over 16 million colors results.

On the other hand, most computer-driven printing devices, such as laser, dot-matrix, and ink-jet printers, operate in a binary fashion: the output medium is divided into a number of pixels, and the printing device can only print a dot at the pixel location or leave it blank: there ordinarily is no dot-size or intensity choice. In the case of monochrome printers, all of the dots are printed in a single color. In a color printer, the same dot can be printed with various combinations of the printer's basic color components (e.g. cyan, magenta, and yellow) but, again, each component color has only two values: printed or not.

To render the underlying, high-value-resolution image with such a low-value-resolution device, the high-value-resolution image must be converted into a binary-valued image pattern that the human visual system will tend to integrate to create an illusion of the higher-value-resolution source image. The half-toning process employed in printing for generations performs such a conversion.

A widely employed approach to performing half-toning digitally is called "ordered dithering." Elements of a dither array of predetermined and generally different threshold values are associated with respective image pixels: the array conceptually overlies the image pixel array. If the dither array is smaller than the image array, the dither array is replicated and "tiles" the image array to produce a repetitive pattern. Each pixel thus has two values conceptually associated with it, namely, the requested pixel tonal value and the corresponding dither-array element. These two values' comparison yields that pixel's value in the output, binary-valued image.

Many dither-array patterns have been proposed and used, each having its own advantages and disadvantages. The type commonly referred to as "clustered-dot" dithering employs a dither matrix in which higher values tend to be clustered near other higher values, and lower values tend to be clustered, too. A uniform gray level tends to be rendered in the binary image as clusters of printed pixels, the cluster size depending on the underlying gray value. The resultant image is visually similar to those produced by the traditional half-tone photoengraving screen. An advantage of clustered-dot dithering is that it is relatively forgiving of certain display devices' inability to display isolated pixels.

But clustered-dot dithering tends not to yield the apparent-gray-scale resolution and spatial-frequency fidelity that "dispersed-dot" dithering affords. The salient feature of this type of dithering is that large and small threshold values are spread throughout the array as evenly as possible. Such arrays tend to achieve relatively good high-spatial-frequency fidelity, and they are also recognized as being capable of relatively fine apparent-value resolution.

SUMMARY OF THE INVENTION

Although dispersed-dot dithering is already recognized as affording relatively high spatial-frequency fidelity, we have devised a way of providing that advantage to an even greater extent than conventional approaches. Specifically, we employ different dispersed-dot dither matrices for the image's different color components, and the dither matrices' values are so chosen that the different colors tend to print in different locations. This affords the effect, particularly in more-lightly colored regions, of yielding a more-continuous appearance.

A way of achieving this result that we prefer for a CMY (cyan, magenta, yellow) color space is to make each element of the cyan dither matrix the additive inverse (modulo the elements' range) of the corresponding magenta-matrix element, and we make the yellow dither matrix a position-offset version of one or the other of the two dither matrices.

BRIEF DESCRIPTION OF THE DRAWINGS

The following discussion of the invention refers to the accompanying drawings, of which:

FIGS. 3A and 3B depict simple versions of dither matrices of the type that can be used in the present invention;

FIG. 4 is a plot of the element values in one dither matrix as a function of the values of the correspondingly positioned elements of another matrix employed in an illustrated embodiment of the invention;

FIG. 5 is a similar plot of the relationships among the elements of three matrices that can be employed to implement the present invention's teachings;

FIG. 6 is a similar plot of three further matrices that comport with the present invention's teachings;

DETAILED DESCRIPTION OF ILLUSTRATIVE EMBODIMENTS

As the invention description proceeds, it will become apparent that the invention can be embodied in dedicated circuitry designed particularly to implement the invention's teachings. Such an arrangement can be included within a printer that receives instructions in terms of high-resolution nominal colors or gray scales, and the dedicated circuitry can be designed to convert the requested values to the on-and-off or other low-value-resolution instructions required to render the requested image. But the invention will more typically be implemented by a general-purpose machine, such as a personal computer operating as a printer driver, whose purpose is to convert an image expressed in nominal color values into display-device commands that specify the low-level, typically on-or-off operation of a printer that the computer controls.

Figure 1:
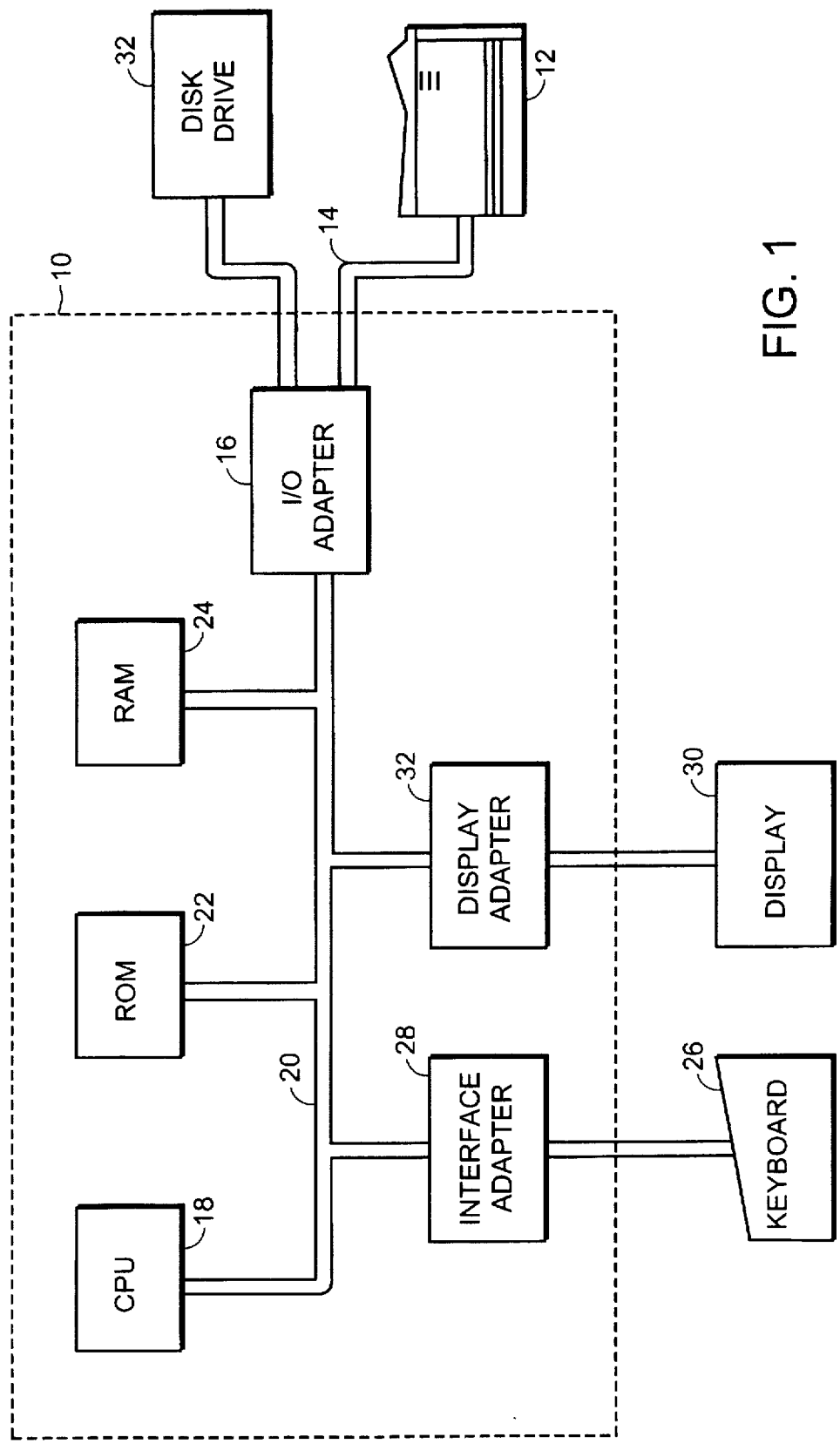
FIG. 1 is a block diagram that constitutes a hardware-type representation of the typical environment in which the present invention is employed.

FIG. 1 depicts a typical hardware environment. A personal computer 10 sends a display device such as an ink-jet printer 12 low-level instructions, i.e., instructions that specify which individual display-medium pixels should receive ink dots. The drawing depicts the printer 12 as receiving these instructions by way of an appropriate channel 14. Computers that are capable of practicing the present invention come in a wide variety of configurations, and FIG. 1 depicts one in which channel 14 is provided by an input-output adapter 16 with which a central processing unit 18 communicates by way of an internal bus 20.

Of course, the central processing unit 18 will typically fetch data and instructions at various times from a variety of sources, such as solid-state read-only and read-write memories 22 and 24. FIG. 1 also depicts the computer 10 as communicating, as is typical, with a keyboard 26 by way of an interface adapter 28.

The present invention particularly concerns display devices within this environment. In this connection FIG. 1 depicts the central processing unit 18 as being coupled to a cathode-ray-tube display 30 by a display adapter 32. The computer 10 can employ the present invention's teachings not only to drive printer 12 but also to form an image on the cathode-ray-tube display 30; the broader aspects of the invention are applicable to any pixel-organized display device. But its use on display devices of the cathode-ray-tube type will be infrequent, because present-day cathode-ray-tube computer monitors such as display 30 can provide pixel-value resolution greater than the simple on-or-off choice to which most printers are limited. Although dithering can be practiced in a conversion from a high value resolution to any lower value resolution, not merely to binary representations only, the value resolution of which most monitors are currently capable is usually considered adequate. Nonetheless, the present invention's teachings are applicable to digital pixel-oriented display devices generally; they are not limited to ink-jet or other printers.

In the typical situation, the computer 10 implements the present invention's teachings by acting as a printer driver. The instructions that configure the computer to perform this function are usually contained in the operating-system software transferred to the computer's disc drive 33 and stored in a disc that the drive contains. Often, the driver software will have been loaded into the computer system from a diskette or CD-ROM. In any event, the computer 10 reads the printer-driver instructions from the disc drive in most cases and then performs the below-described functions to implement the present invention's teachings.

Figure 2:
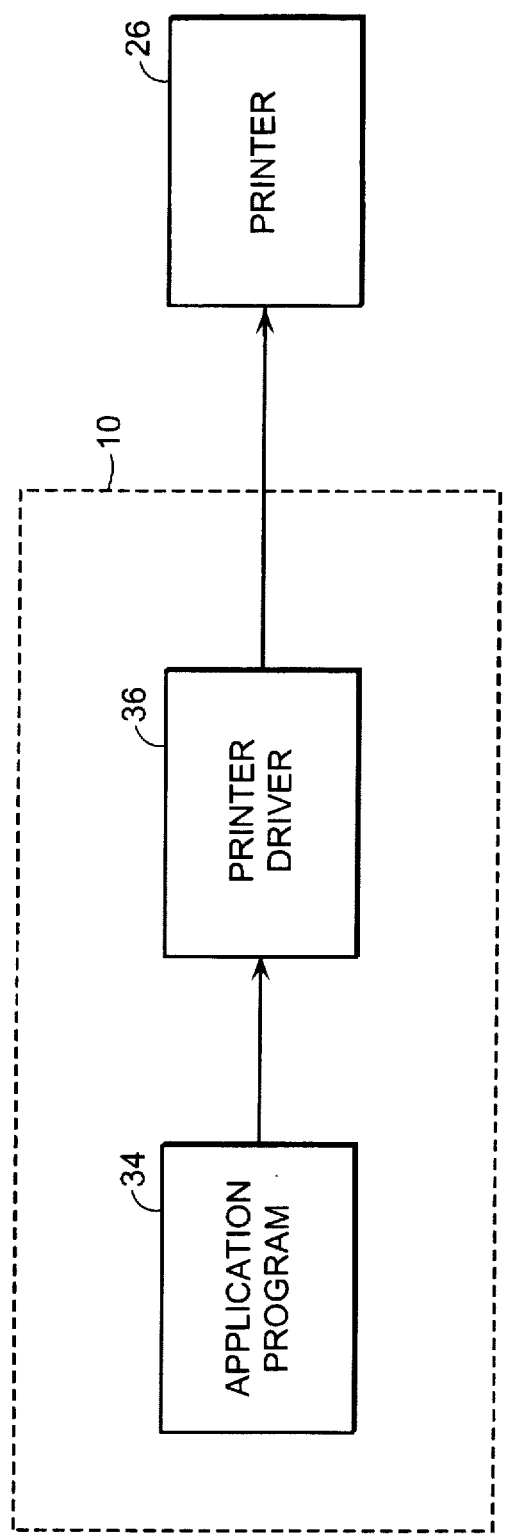
FIG. 2 is a block diagram giving a more software-oriented rendition of that environment.

FIG. 2 depicts the typical situation from more of a software standpoint. Typically, the present invention's teachings will come into play when the computer 10 is operating a user's application program 34 and that program makes a system call requesting that an image be printed. The requested operation is carried out by a printer driver, which is usually considered to be part of the operating system but is specific to the designated printer. The printer driver's purpose is to convert a device-independent representation of the image into low-level printer instructions that will render that image as faithfully as the printer's limitations permit.

As was stated above, each of a given pixel's color-value components is expressed as a multi-bit value at some point, but the display device is capable only of either applying that color component or not in any given pixel; it cannot "paint" the pixel with any greater value resolution than that. (For ease of description, we assume here that the output of the dithering process is to be single-bit values, but those skilled in the art will recognize that the broader teachings of the present invention can be applied to multi-level dithering also.) To convert from the high-resolution values to the lower-resolution values to which the display mechanism is limited, we employ a dither matrix.

FIG. 3A depicts a simplified version of such a matrix. For ease of illustration, FIG. 3A depicts only a 4×4 dither matrix to be used for pixel components expressed in five-bit words, i.e., components that have a thirty-two-value range, from 0 through 31. For dispersed-dot dither, a more-representative example would be a matrix of, say, 64×64 employed for eight-bit values, which would extend from 0 to 255. To determine which display pixels will receive a dot of a given color component, the matrix of FIG. 3A is conceptually overlaid on adjacent pixels. A single instance of the dither matrix typically does not cover the entire display area, so the matrix is replicated so as to "tile" the display completely.

A given pixel receives a given-color-component dot if that component's value equals or exceeds the value of the dither-matrix element corresponding to the given pixel. So if, say, the value of the cyan component of the pixel corresponding to the upper-right element of the dither matrix has a value of 28, that pixel receives a cyan dot. But if the lower-left pixel's cyan component has a value of 28, that pixel receives no cyan dot, because 28 is less than the value, 31, of the corresponding dither-matrix element. Still, a pixel value of 28 exceeds most dither-matrix-element values, so in a region whose cyan component is 28 most pixels receive cyan dots. Since the observer's eye integrates the image, the observer perceives a relatively high cyan intensity.

In conventional dispersed-dot dithering, the same dither matrix would be employed to determine whether those same display pixels receive magenta and yellow, too. So in a region in which the desire is to portray a light green by requesting cyan, magenta, and yellow values of 6, 0, and 6, respectively, approximately one-eighth of the pixels would receive both cyan and yellow dots, and none would receive any other dot combination.

But we have recognized that a smoother appearance, particularly in light-colored regions produced by systems whose input value range is, as is typical, an order of magnitude greater than that illustrated, can be achieved by employing different matrices for the different color components. This is true because the use of different matrices tends to make the different-colored dots less likely to coincide on the same pixels, so more pixels receive dots: a smoother appearance results because the display medium is less sparsely populated with "painted" pixels.

We therefore prefer to choose the different dither matrices in such a way as to maximize the likelihood that components of lighter colors will not coincide. In our view, this relationship is most important for cyan and magenta. So if FIG. 3A represents the dither matrix for, say, cyan, we prefer for the magenta dither matrix to be one such as that of FIG. 3B. A comparison of FIGS. 3A and 3B reveals that the high values in the FIG. 3A matrix occur in those pixels that have low values in the FIG. 3B matrix, and vice-versa. This was achieved simply by subtracting each element of FIG. 3A from the range, 32, for which the dither matrix is intended: in a field of 32 elements, the values in the magenta matrix are the additive inverses of the cyan-matrix elements.

FIG. 4 shows this relationship graphically: as the cyan-matrix values increase, the corresponding magenta-matrix values decrease. The result is that cyan and magenta dots never coincide in regions in which the average of the cyan and magenta values is less than half the color-component range. And the coincidences that do occur are located only in the darker-colored areas, where the appearance inherently tends to be smoother, anyway.

If, as we prefer, the cyan and magenta dither matrices are complementary, one cannot create a dither matrix that causes the yellow-dot occurrences to be as disjoint with those of both cyan and magenta dots as the occurrences of cyan and magenta dots are with each other. This is acceptable, since it is not as important from an appearance standpoint for the yellow dots' occurrences to be disjoint with those of the other two components' dots.

Still, there is value in making yellow dots' occurrences as disjoint from the others as possible. To this end, one can generate a yellow dither matrix similarly to the magenta-matrix generation, namely, by making the yellow-matrix element a function of the corresponding cyan or magenta matrix. For instance, FIG. 5 depicts the result of generating the yellow matrix by simply adding half the color-component range to corresponding values of the cyan matrix. Indeed, the magenta and yellow matrices can both be generated in a similar fashion from the cyan matrix, as can be seen in FIG. 6, which depicts the results of generating elements of the magenta and yellow matrices by adding one-third and two-thirds, respectively, of the pixel-component-value range to corresponding elements of the cyan matrix.

Although any of these approaches is acceptable, we actually employ a somewhat different approach. In an implementation that we have employed, the pixel-component-value range is 0 to 255, while the dispersed-dot-dither matrix that we use is 64×64, so each possible element value occurs approximately sixteen times in the matrix. This means that two pixel locations whose cyan and magenta matrix values are the same can have different yellow values. And, indeed, we employ an approach that can yield such a result. Specifically, we choose a row and column offset and assign to each location in the yellow dither matrix the element value in the cyan-matrix location displaced from that yellow-matrix location by those row and column offsets.

In accordance with the invention's broader teachings, the printer can be operated in a manner that is conventional except for the fact that the different color components are dithered with different matrices. The particular matrices employed, and the way of insuring that they differ, are not critical to the invention, but the invention is practiced most advantageously if, for at least two of the components, less than half the matrix locations have both components' values in the same half of the component-value range.

Figure 7:
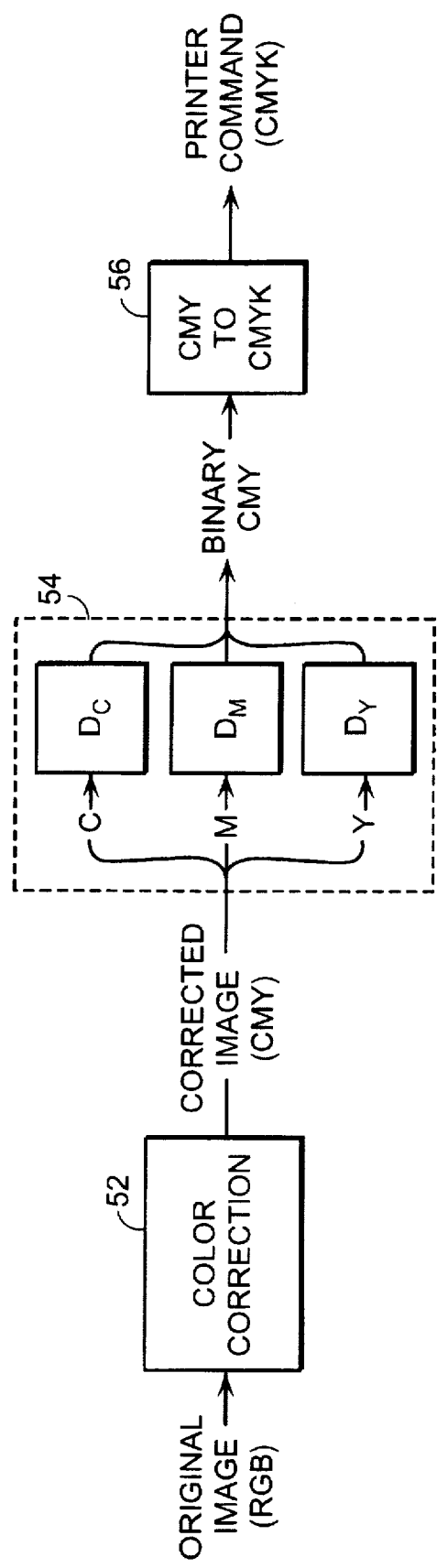
FIG. 7 is a block diagram of a typical relationship between the dither process and generation of binary CMYK signals.

FIG. 7 depicts a typical, but not the exclusive, way to implement the invention. In FIG. 7, we assume that the display device is, say, a printer that can print black as well as cyan, magenta, and yellow. Also for the sake of concreteness, we will assume that the image is at some point generated or stored in terms of red, green, and blue values instead, and that each color component is expressed with, say, eight-bit resolution. This is a relatively typical arrangement. As part of the printing process, some apparatus, often a personal computer configured as a printer driver for this purpose, performs a wide range of adjustments to which FIG. 7 collectively refers as a color-correction step 52.

The particular type of processing that occurs here is not important to the present invention. Since the printer color agents are subtractive, we have depicted processing 52 for ease of discussion as including conversion from the additive-color, RGB color space to the subtractive-color, CMY color space, although this trivial conversion actually may not be performed anywhere explicitly. (Determining whether a given CMY component value exceeds a given dither-matrix threshold is equivalent to determining whether the complementary RGB component is less than an inverse threshold value.) More substantially, the process will make changes from the nominal color values to accommodate the limitations of the inks, the paper, etc. in accurately displaying the intended nominal color. Other accommodations to the paper or other medium may be made, such as limiting the color darkness (that is, increasing RGB values or decreasing CMY values) to avoid bleeding that can otherwise occur on some types of media. Also, the shapes of the ink spots that a printer actually deposits result in a non-linear relationship between the number of dots deposited and the resultant intensity, and accommodations may be made for these effects.

Regardless of what type of processing 52 is performed, a multiple-bit-per-component color specification at some point needs to be converted into the binary, ink-or-no-ink command to be sent to the printer. This is the purpose of the dithering process 54. And it is at this point that we use the different matrices for the different components. That is, if we consider a single component value from each of a given image's pixel values collectively to constitute one image component, the dither matrix that we use to convert from the constituent high-resolution values of one source-image component to the lower-resolution (typically binary) values of an output-image component differs from that used for the corresponding conversion of at least one of the other image components. The result can then be sent without change to the printer, but instead there is often a CMY-to-CMYK conversion 56. This essentially leaves the resultant binary cyan, magenta, and yellow values unchanged unless they all call for a dot at the same location. The color that results from printing all three components at the same pixel is black, and it is often considered preferable to substitute black ink. In such cases, the cyan, magenta, and yellow components are reset to zero, and a K (black) component is set to one to command the printer to apply black ink rather than cyan, magenta, and yellow.

Although the invention can be applied simply as FIG. 7 illustrates, we prefer in some instances to modify it slightly for those cases in which the medium on which the image is to be printed imposes an ink-duty-cycle limit. As was explained above, part of the processing step 52 may have as its purpose to limit the ink duty cycle by limiting the color-component values; if values are not permitted to exceed a predetermined limit, the percentage of dither-matrix elements that those values exceed is similarly limited, so the ink duty cycle is, too. That is, certain display pixels correspond to matrix elements that exceed the imposed limit, so, in conventional dithering, imposing that limit will guarantee that those locations never receive dots and the duty-cycle-limitation is thereby observed.

But our use of different dither matrices for different color components changes the resultant duty cycle. Since we have so chosen the matrices that a pixel having a high-valued element in one color component's dither matrix will tend to have a low element value in the dither matrix for a different color component, a given component-value limit results in much fewer pixels' being guaranteed not to receive dots. So if the image's different color components are separately dithered, the ink duty cycle no longer satisfies the limitation that a given component-value limitation guarantees when a common dither matrix is employed. To compensate for this effect, we supplement the single-ink limitation by additionally imposing a total-ink-duty-cycle limitation in a manner that will now be described by reference to FIG. 8.

Figure 8:
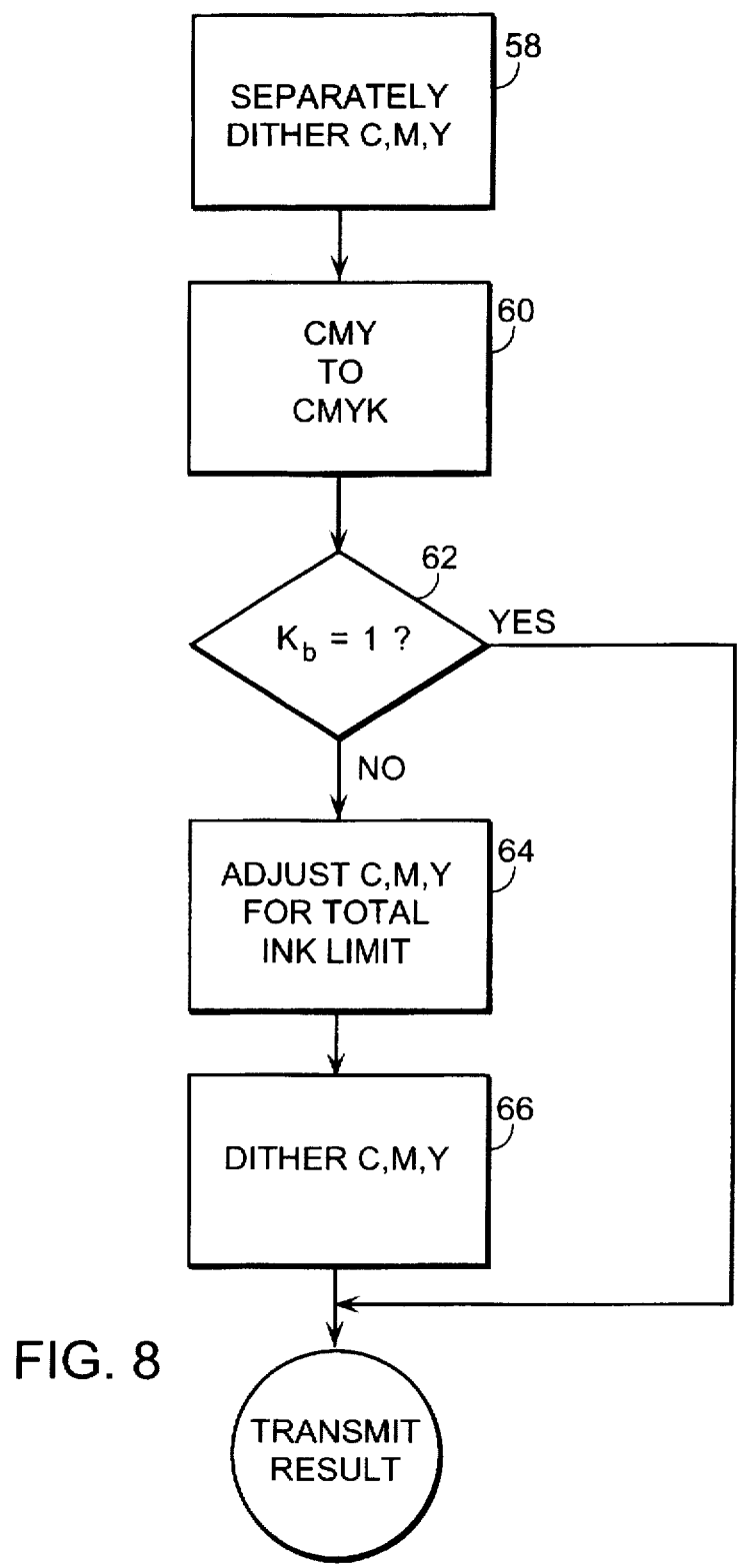
FIG. 8 is a flow chart illustrating one procedure for implementing the present invention.

FIG. 8's blocks 58 and 60 represent separately dithering the three image components in the manner previously described and then performing the CMY-to-CMYK conversion that FIG. 7's block 56 represents. But rather than simply sending the results as commands to the printer, we check to determine whether the result was an indication that black should be printed, as FIG. 8's block 62 indicates. If so, then the printer is simply instructed accordingly, as before. Otherwise, the color-component values are adjusted to impose a total-ink limit, and the dither process is repeated, as blocks 64 and 66 indicate.

Suppose, for instance, that we have imposed a total-duty-cycle limit of 240%. That is, the total of the duty cycles for cyan, magenta, and yellow cannot exceed 240%. This means that the average of those component values cannot exceed 240%÷3=80% of the full-range value. So if the total of the unadjusted values exceeds 240% of the full component-value range, we subtract one-third of the difference from each of the unadjusted components to arrive at adjusted components, whose total value thereby equals the limit, and we dither the result, as FIG. 8's block 66 indicates.

We have found that employing this approach yields a much smoother appearance for light colors and thus constitutes a significant advance in the art.

We claim:

1. For operating an image-presenting mechanism to present an image, a method comprising the steps of:

in response to electrical source-image signals representing a source image, performing a sequence of at least one image-revision step, in which sequence each image-revision step receives an input image consisting of input pixels and produces therefrom an output image consisting of output pixels, wherein the input image of the first image-revision step is the source image and the input image of any subsequent image-revision step is the output image of the preceding image-revision step, wherein one said image-revision step is a half-toning step whose input image consists of source color pixel values of a first resolution each of which consists of a plurality of color component values and whose output image consists of output pixel values of a second resolution, coarser than the first resolution, that the half-toning step determines by applying respective dither matrices to respective components of the source image, wherein a first dither matrix applied to at least one of the source-image components differs from a second dither matrix applied to at least one of the other source-image components such that the elements of the first dither matrix are the differences between a common range value and the corresponding elements of the second dither matrix; and applying to the image-presenting mechanism electrical command signals that represent the output of the last image-revision step.

2. A method as defined in claim 1 wherein at least one of the dither matrices applied to a component of the half-toning step's input image is a dispersed-dot dither matrix.

3. A method as defined in claim 1 wherein the component of the half-toning step's input image to which the first dither matrix is applied is a cyan image component and the component of the half-toning step's input image to which the second dither matrix is applied is a magenta image component.

4. A method as defined in claim 2 wherein the component of the half-toning step's input image to which the first dither matrix is applied is a cyan image component and the component of the half-toning step's input image to which the second dither matrix is applied is a magenta image component.

5. For operating an image-presenting mechanism to present an image, an apparatus comprising:

image-revision circuitry responsive to electrical source-image signals representing the source image for performing a sequence of at least one image-revision step, in which sequence each image-revision step receives an input image consisting of input pixels and produces therefrom an output image consisting of output pixels, wherein the input image of the first image-revision step is the source image and the input image of any subsequent image-revision step is the output image of the preceding image-revision step, wherein one said image-revision step is a half-toning step whose input image consists of source color pixel values of a first resolution each of which consists of a plurality of color component values and whose output image consists of output pixel values of a second resolution, coarser than the first resolution, that the half-toning step determines by applying respective dither matrices to respective components of the source image, wherein a first dither matrix applied to at least one of the source-image components differs from a second dither matrix applied to at least one of the other source-image components such that the elements of the first dither matrix are the differences between a common range value and the corresponding elements of the second dither matrix; and output circuitry responsive to the image-revision circuitry for applying to the image-presenting mechanism electrical command signals that represent the output of the last image-revision step.

6. An apparatus as defined in claim 5 wherein at least one of the dither matrices applied to a component of the half-toning step's input image is a dispersed-dot dither matrix.

7. An apparatus as defined in claim 5 wherein the component of the half-toning step's input image to which the first dither matrix is applied is a cyan image component and the component of the half-toning step's input image to which the second dither matrix is applied is a magenta image component.

8. An apparatus as defined in claim 6 wherein the component of the half-toning step's input image to which the first dither matrix is applied is a cyan image component and the component of the half-toning step's input image to which the second dither matrix is applied is a magenta image component.

9. An imaging apparatus comprising:

an image-presenting mechanism for presenting an image;

image-revision circuitry responsive to electrical source-image signals representing a source image for performing a sequence of at least one image-revision step, in which sequence each image-revision step receives an input image consisting of input pixels and produces therefrom an output image consisting of output pixels, wherein the input image of the first image-revision step is the source image and the input image of any subsequent image-revision step is the output image of the preceding image-revision step, wherein one said image-revision step is a half-toning step whose input image consists of source color pixel values of a first resolution each of which consists of a plurality of color component values and whose output image consists of output pixel values of a second resolution, coarser than the first resolution, that the half-toning step determines by applying respective dither matrices to respective components of the source image, wherein a first dither matrix applied to at least one of the source-image components differs from a second dither matrix applied to at least one of the other source-image components such that the elements of the first dither matrix are the differences between a common range value and the corresponding elements of the second dither matrix; and output circuitry responsive to the image-revision circuitry for applying to the image-presenting mechanism electrical command signals that represent the output of the last image-revision step.

10. An imaging apparatus as defined in claim 9 wherein at least one of the dither matrices applied to a component of the half-toning step's input image is a dispersed-dot dither matrix.

11. An imaging apparatus as defined in claim 9 wherein the component of the half-toning step's input image to which the first dither matrix is applied is a cyan image component and the component of the half-toning step's input image to which the second dither matrix is applied is a magenta image component.

12. An imaging apparatus as defined in claim 10 wherein the component of the half-toning step's input image to which the first dither matrix is applied is a cyan image component and the component of the half-toning step's input image to which the second dither matrix is applied is a magenta image component.

13. A storage medium containing instructions readable by a computer to configure the computer to function as an apparatus for operating an image-presenting mechanism to present an image, which apparatus comprises:

image-revision circuitry responsive to electrical source-image signals representing a source image for performing a sequence of at least one image-revision step, in which sequence each image-revision step receives an input image consisting of input pixels and produces therefrom an output image consisting of output pixels, wherein the input image of the first image-revision step is the source image and the input image of any subsequent image-revision step is the output image of the preceding image-revision step, wherein one said image-revision step is a half-toning step whose input image consists of source color pixel values of a first resolution each of which consists of a plurality of color component values and whose output image consists of output pixel values of a second resolution, coarser than the first resolution, that the half-toning step determines by applying respective dither matrices to respective components of the source image, wherein a first dither matrix applied to at least one of the source-image components differs from a second dither matrix applied to at least one of the other source-image components such that the elements of the first dither matrix are the differences between a common range value and the corresponding elements of the second dither matrix; and output circuitry responsive to the image-revision circuitry for applying to the image-presenting mechanism electrical command signals that represent the output of the last image-revision step.

14. A storage medium as defined in claim 13 wherein at least one of the dither matrices applied to a component of the half-toning step's input image is a dispersed-dot dither matrix.

15. A storage medium as defined in claim 13 wherein the component of the half-toning step's input image to which the first dither matrix is applied is a cyan image component and the component of the half-toning step's input image to which the second dither matrix is applied is a magenta image component.

16. A storage medium as defined in claim 14 wherein the component of the half-toning step's input image to which the first dither matrix is applied is a cyan image component and the component of the half-toning step's input image to which the second dither matrix is applied is a magenta image component.

\* \* \* \* \*